United States Patent
Chen et al.

(10) Patent No.: US 10,829,595 B2
(45) Date of Patent: Nov. 10, 2020

(54) POLYPHENYLENE SULFIDE POLYMERS HAVING IMPROVED MELT-STABILITY

(71) Applicant: SOLVAY SPECIALTY POLYMERS USA, LLC, Alpharetta, GA (US)

(72) Inventors: Hong Chen, Alpharetta, GA (US); Peter Mushenheim, Atlanta, GA (US); Lee Carvell, Cumming, GA (US); Erik Nelson, Borger, TX (US); Charles R. Hoppin, Johns Creek, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 0 days.

(21) Appl. No.: 15/889,553

(22) Filed: Feb. 6, 2018

(65) Prior Publication Data

US 2019/0241706 A1    Aug. 8, 2019

(51) Int. Cl.
| | |
|---|---|
| *C08G 75/0231* | (2016.01) |
| *C08G 75/0213* | (2016.01) |
| *D01F 6/76* | (2006.01) |
| *C08G 75/0259* | (2016.01) |
| *C08G 75/00* | (2006.01) |
| *C08G 75/02* | (2016.01) |
| *C08G 75/0209* | (2016.01) |

(52) U.S. Cl.
CPC ......... *C08G 75/0231* (2013.01); *C08G 75/00* (2013.01); *C08G 75/02* (2013.01); *C08G 75/0209* (2013.01); *C08G 75/0213* (2013.01); *C08G 75/0259* (2013.01); *D01F 6/765* (2013.01); *D10B 2401/04* (2013.01); *D10B 2505/04* (2013.01)

(58) Field of Classification Search
CPC .. C08G 75/14; C08G 75/025; C08G 75/0281; C08F 6/28
See application file for complete search history.

(56) References Cited

U.S. PATENT DOCUMENTS

| 5,561,199 | A | * | 10/1996 | Nagaoka | C08L 71/12 524/424 |
|---|---|---|---|---|---|
| 2006/0074219 | A1 | * | 4/2006 | Kawama | C08G 75/0259 528/388 |
| 2010/0272994 | A1 | * | 10/2010 | Carlson | C09K 8/80 428/401 |
| 2017/0226292 | A1 | * | 8/2017 | Katsuta | D02J 1/22 |

* cited by examiner

*Primary Examiner* — Shane Fang
(74) *Attorney, Agent, or Firm* — Beatrice C. Ortego

(57) ABSTRACT

Described here are polyphenylene sulfide ("PPS") polymers having significantly improved processability. It was surprisingly found that PPS polymers, terminated with specific end-capping agents in specific amounts, had significantly improved melt stability. Because of the significantly improved melt stability, the PPS polymers can be advantageously incorporated into melt processing techniques.

15 Claims, No Drawings

POLYPHENYLENE SULFIDE POLYMERS HAVING IMPROVED MELT-STABILITY

TECHNICAL FIELD OF THE INVENTION

The invention is directed to polyphenylene sulfide polymers having improved melt-stability.

BACKGROUND OF THE INVENTION

Polyphenylene sulfide ("PPS") polymers are used for the production of a wide variety of articles. Generally, the type and quality of articles that can be formed from PPS polymer depends on the processability of the polymer. Processing PPS polymer involves heating the polymer above the melting temperature. The stability of the polymer at such elevated temperatures is a significant factor in determining the suitability of the PPS polymer for an intended article. Accordingly, PPS polymers having increased processability, can be used in a large number of application settings, relative to PPS polymers having lower processability.

DETAILED DESCRIPTION OF THE INVENTION

Described here are polyphenylene sulfide ("PPS") polymers having significantly improved processability. It was surprisingly found that PPS polymers, terminated with specific end-capping agents in specific amounts, had significantly improved melt stability. Because of the significantly improved melt stability, the PPS polymers can be advantageously incorporated into melt processing techniques.

As described in more detail below, in melt processing, the melt stability of the PPS polymer can significantly affect its processability. Melt processing involves melting solid PPS polymer and maintaining the melted PPS polymer within a processing temperature window (at or above the melting temperature of the PPS polymer) for a pre-determined period of time. The molten PPS polymer is then shaped into a desired article, for example, using a die, nozzle or other such device used in the art to form shapes from molten polymeric materials. During the time the PPS polymer is maintained within the processing temperature window, the PPS polymer can undergo thermal oxidative degradation, leading to significantly changed molecular weights and changing rheological properties including, but not limited to, changing melt viscosities. Due to the changes in melt viscosity as the melted PPS polymer is being maintained within the processing temperature window, the pre-determined period of time may no longer be appropriate, and defects can easily be introduced into the shaped article. For example, in extrusion processing, solid PPS is melted in an extruder having a heated barrel to maintain the PPS polymer within the processing temperature window. The PPS polymer is generally passed through the length of the extruder barrel at a pre-determined rate. As the molten PPS polymer exits the extruder, it can be shaped, as described above. The time the PPS polymer spends in the barrel is referred to as the residence time and, correspondingly, because the rate is pre-determined, so is the residence time. However, the more the PPS polymer undergoes thermal oxidative degradation in the barrel during the residence time, the more the melt viscosity changes (e.g. decreases), and the pre-determined residence time is no longer appropriate because it was pre-determined on the basis of a different (e.g. higher) melt viscosity. Furthermore, degraded PPS polymer can stick to and accumulate on the inner walls of the barrel or obstruct the shaping tool (e.g. die or nozzle). Both can lead to defects in the ultimately shaped article. Accordingly, because the PPS polymers described herein have significantly improved melt-stability, the occurrence of defects in shaped articles is significantly decreased, relative to PPS polymer having reduced melt stability.

The Polyphenylene Sulfide Polymer

The PPS polymer has at least 50 mol % of a recurring unit ($R_{PPS}$), relative to the total number of recurring units in the PPS polymer. In some embodiments, the PPS polymer has at least 60 mol %, at least 70 mol %, at least 80 mol %, at least 90 mol %, at least 95 mol % or at least 99 mol % recurring unit ($R_{PPS}$), relative to the total number of recurring units in the PPS polymer. Recurring unit ($R_{PPS}$) is represented by the following formula:

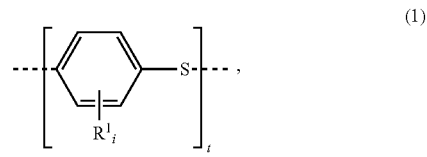

where $R^1$, at each location, is independently selected from the group consisting of an alkyl, an aryl, an alkoxy, an aryloxy, an alkylketone, an arylketone, a fluoroalkyl, a fluoroaryl, a bromoalkyl, a bromoaryl, a chloroalkyl, a chloroaryl, an alkylsulfone, an arylsulfone, an alkylamide, an arylamide, an alkylester, an arylester, a fluorine, a chlorine, and a bromine; i is an integer from 0 to 4, preferably 0; and t is an integer greater than 50, preferably greater than 100. As used herein, a dashed bond indicates a bond to an atom outside the recurring unit. For example, the dashed bond can be a bond to an identical recurring unit, a different recurring unit, or an atom of a non-recurring unit (e.g. an end-capper). The PPS polymer can include one or more additional recurring units ($R^*_{PPS}$). In such cases, each additional recurring unit ($R^*_{PPS}$) is distinct from each other and from recurring unit ($R_{PPS}$). In embodiments including one or more additional recurring units ($R^*_{PPS}$), the total concentration of recurring unit ($R_{PPS}$) and one or more additional recurring units ($R^*_{PPS}$), is at least 50 mol % and, in some embodiments, at least 60 mol %, at least 70 mol %, at least 80 mol %, at least 90 mol %, at least 95 mol % or at least 99 mol %, relative to the total number of recurring units in the PPS polymer.

The PPS polymer contains metal end-capping agents, including but not limited to, calcium end-capping agents and sodium end-capping agents. The calcium end-capping agents are represented by a formula selected from the following group of formulae:

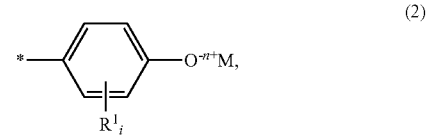

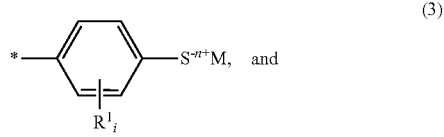

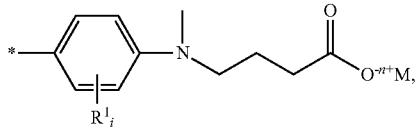

(4)

where M is Ca and n is 2. In Formulae (2) to (4), the "*" indicates a bond to the sulfur atom on recurring unit ($R_{PPS}$). Each sodium end-capping agent is represented by a formula selected from the group of formulae consisting of Formulae (2) to (4), where M is Na and n is 1. A person of ordinary skill in the art will recognize that a PPS polymer includes many polymer chains having two chain ends (terminal ends). Accordingly, such chains can have 0 to 2 end-capping agents according to Formula (2) to (4). The PPS polymer has polymer chains containing each of the end-capping agents according to Formulae (2) to (4), with M as Na and with M as Ca. Put in another way, each of the end-capping agents according to Formulae (2) to (4), with M as Na and with M as Ca, is present in the PPS polymer. For ease of reference, end-capping agents according to Formulae (2) to (4) with M as Na are referred to as sodium end-capping agents. Analogously, end-capping agents according to Formulae (2) to (4) with M as Ca are referred to as calcium end-capping agents.

It was surprisingly discovered that PPS polymers having selected calcium end-capping agent concentrations and selected sodium end-capping agent concentrations had significantly improved melt-stability. The PPS polymers have a calcium end-capping agent concentration of no more than 10 microequivalents ("µeq") (micromoles end-capping agent per gram of PPS polymers) and a sodium end-capping agent concentration of at least 10 µeq had surprisingly improved melt-stability. In some embodiments, the calcium end-capping agent concentration is no more than 6 µeq, no more than 5.5 µeq, no more than 5.0 µeq, no more than 4.5 µeq, no more than 4.0 µeq, no more than 3.9 µeq or no more than 3.6 µeq. Additionally or alternatively, the sodium end-capping agent concentration can be at least 11 µeq, at least 11.5 µeq, at least 12 µeq, at least 12.5 µeq, at least 13 µeq, or at least 13.6 µeq. The end-capping agent concentration can be measured using Inductively Coupled Plasma ("ICP")-Optical Emission Spectroscopy ("OES"), as described in the Examples.

In one aspect, the improved melt-stability is reflected in the stability of the melt viscosity. The PPS polymers described herein have a VR40 of from 0.85 to 1.15. The VR40 is ratio of the melt viscosity at 40 minutes ("MV40") to melt viscosity at 5 minutes ("MV5") VR40=MV40/MV5. The melt viscosity is measured by heating the PPS polymer to a temperature of 310° C. and maintaining the temperature at 310° C. Time zero corresponds to the time after the PPS polymer is loaded into the barrel of the rheometer and the PPS polymer temperature reaches 310° C. MV40 is the melt viscosity of the polymer after 40 minutes at 310° C. Correspondingly, MV5 is the melt viscosity of the PPS polymer after 5 minutes at 310° C. As used herein, melt viscosity refers to melt viscosity at 1216 $s^{-1}$. At VR40=1, there is no measurable change in the melt viscosity of the PPS polymer over 35 minutes (40 minutes–5 minutes) at 310° C. Accordingly, PPS polymers having a VR40 closer to 1 have increased melt viscosity stability, relative to PPS polymers having a VR40 farther away from 1. In some embodiments, the VR40 of the PPS polymer is at least 0.87, at least 0.9, at least 0.93, at least 0.95, at least 0.96, at least 0.97, or at least 0.98. Additionally or alternatively, in some embodiments, the PPS polymer can have a VR40 of no more than 1.10, no more than 1.07, no more than 1.05, no more than 1.04, no more than 1.03 or no more than 1.02. The melt viscosity (including MV5 and MV40) can be measured as described in the Examples.

In another aspect, the improved melt-stability is reflected in the weight stability of the PPS polymer when being heated. The PPS polymers described herein can have a relative weight loss at 310° C. of no more than 0.1%. To measure relative weight loss, the PPS polymer can be heated as a selected heating ramp rate and the weight of the PPS polymer can be recorded at different temperatures. The relative weight loss at 310° C. ("WL310") is 100 times the difference between the weight of the PPS polymer at 100° C. ("W100") and the weight of the PPS polymer at 310° C. ("W310"), relative to W100: WL310=100*(W100–W310)/W100. A WL310 of 0 indicates that there is no measurable change in the weight of the PPS from 100° C. Accordingly PPS polymers having a WL310 closer to 0%, have increased weight stability relative to PPS polymers having a WL310 farther from 0%. In some embodiments, the PPS polymers have a WL310 of no more than 0.09%, no more than 0.08%, no more than 0.07%, no more than 0.06%, no more than 0.05% or no more than 0.04%. Analogously, the PPS polymers described herein can have a relative weight loss at 350° C. of no more than 0.15%. The relative weight loss at 350° C. ("WL350") is 100 times the difference between W100 and the weight of the PPS polymer at 350° C. ("W350"), relative to W100:WL350=100*(W100–W350)/W100. In some embodiments, the PPS polymers have a WL310 of no more than 0.14%, no more than 0.13%, no more than 0.12%, no more than 0.11% or no more than 0.10%. Weight and relative weight loss can be measured as described in the Examples.

Synthesis of Polyphenylene Sulfide Polymers

The PPS polymer synthesis includes a polymerization process and a subsequent recovery process. The polymerization process includes a polymerization reaction, in which a para-dihalobenzene compound and sulfur compound are polymerized to form the PPS polymer, and a termination, in which the polymerization reaction is stopped.

The polymerization process includes a polymerization reaction and a termination. The polymerization reaction includes contacting a para-dihalobenzene compound and a sulfur compound in the presence of a polymerization solvent (collectively, "reaction components") to form the PPS polymer. In some embodiments, the reaction components further include a molecular weight modifying agent. The para-dihalobenzene compound is represented by the following formula:

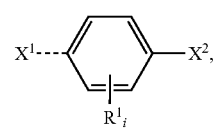

(5)

where $X^1$ and $X^2$ are independently selected from the group of halogens consisting of F, Cl, Br, I and At. In some embodiments, $X^1$ and $X^2$ are the same. Additionally or alternatively, in some embodiments, each i is zero. Examples of desirable para-dihalobenzene compounds include, but are not limited to, p-dichlorobenzene ("P-DCB"), p-dibromobenzene, p-diiodobenzene, 1-chloro-4-bromobenzene, and 1-chloro-4-iodobenzene. In some embodiments, the reaction componenets can include a plurality of distinct para-dihalobenzene compounds according to Formula (5).

The sulfur compound is selected from the group consisting of thiosulfates, thioureas, thioamides, elemental sulfur, thiocarbamates, metal disulfides and oxysulfides, thiocarbonates, organic mercaptans, organic mercaptides, organic sulfides, alkali metal sulfides and bisulfides, and hydrogen sulfide. Preferably, the sulfur compound is an alkali metal sulfide. In some embodiments, the alkali metal sulfide is generated in situ from an alkali metal hydrosulfide and an alkali metal hydroxide. For example, $Na_2S$ is a particularly desirable alkali metal sulfide. $Na_2S$ can be generated in situ from NaSH and NaOH.

The polymerization solvent is elected such that it is a solvent for the para-dihalobenzene compound, the sulfur compound and the synthesized PPS, at the reaction temperature (discussed below). In some embodiments, the polymerization solvent is a polar aprotic solvent. Examples of desirable polar aprotic solvents include, but are not limited to, hexamethylphosphoramide, tetramethylurea, n,n-ethylenedipyrrolidone, n-methyl-2-pyrrolidone ("NMP"), pyrrolidone, caprolactam, n-ethylcaprolactam, sulfolane, n,n'-dimethylacetamide, and 1,3-dimethyl-2-imidazolidinone. Preferably, the polymerization solvent is NMP. In embodiments, in which the polymerization solvent includes NMP, NMP can react with NaOH to form n-methyl-1,4-aminobutanoate ("SMAB").

As noted above, in some embodiments, the reaction components further include a molecular weight modifying agent. The molecular weight modifying agent increases the molecular weight of the PPS polymer, relative to a synthesis scheme not including the molecular weight modifying agent. Preferably, the molecular weight modifying agent is an alkali metal carbonate. Alkali metal carbonates are represented by the formula: $R'CO_2M'$, where $R'$ is selected from the group consisting of a $C_1$ to $C_{20}$ hydrocarbyl group, a $C_1$ to $C_{20}$ hydrocarbyl group and a $C_1$ to $C_5$ hydrocarbyl group; and $M'$ is selected from the group consisting of lithium, sodium, potassium, rubidium or cesium. Preferably $M'$ is sodium or potassium, most preferably sodium. Preferably, the alkali metal carboxylate is sodium acetate.

The polymerization reaction is performed by contacting the reaction components at a reaction temperature selected such that the para-dihalobenzene compound and the sulfur compound polymerize to form the PPS polymer. In some embodiments, the reaction temperature is from 170° C. to 450° C., or from 200° C. to 285° C. The reaction time (time duration of the polymerization reaction) can be from 10 minutes to 3 days or from 1 hour to 8 hours. During the polymerization reaction, the pressure (reaction pressure) is selected to maintain the reaction components in the liquid phase. In some embodiments, the reaction pressure can be from 0 pounds per square inch gauge ("psig") to 400 psig, from 30 psig to 300 psig, or from 100 psig to 250 psig.

The polymerization reaction can be terminated by cooling the reaction mixture to a temperature at which the polymerization reaction ceases. "Reaction mixture" refers to the mixture formed during the polymerization reaction and contains any remaining reaction components, formed PPS polymer and reaction by-products. The cooling can be performed using a variety of techniques known in the art. In some embodiments, the cooling can include liquid quenching. In liquid quenching, a quench liquid is added to the reaction mixture to cool the reaction mixture. In some embodiments, the quench liquid is selected from the group consisting of the polymerization solvent or water or a combination thereof. In some embodiments, the temperature of the quench liquid can be from about 15° C. to 99° C. In some embodiments, the temperature of the quench liquid can be from 54° C. to 100° C. (e.g. in embodiments in which the quench liquid is the solvent) or from 15° C. to 32° C. (e.g. in embodiments in which the quench liquid is water). The cooling can be further facilitated by use of a reactor jacket or coil, to cool the reaction vessel in which the polymerization reaction is performed ("polymerization reactor"). For clarity, termination of the polymerization reaction does not imply that complete reaction of the para-dihalobenzene compound and the sulfur compound. Generally, termination is initiated at a time when the polymerization reaction is substantially complete or when further reaction of the para-dihalobenzene compound and the sulfur compound would not result in a significant increase in average molecular weight of the PPS polymer.

After termination, the PPS polymer is present as a PPS polymer mixture. The PPS polymer mixture includes water, the polymerization solvent, reaction by-products including salts (e.g. sodium chloride and sodium acetate); PPS oligomers (t less than 10 in Formula 1), and any unreacted reactants (e.g. solvent, para-dihalobenzene compound, and molecular weight modifying agent) (collectively, "post-reaction compounds"). Generally, after termination, the PPS polymer mixture is present as a slurry, having a liquid phase and a solid phase containing the PPS polymer (precipitates from the solvent during liquid quenching). In some embodiments, the PPS polymer mixture can be present as wet PPS polymer, for example, by filtration of the slurry after termination. In general, the PPS polymer mixture includes the PPS polymer, more than 2 weight percent ("wt. %") salt (e.g. sodium chloride and sodium acetate), more than 30 wt. % of the polymerization solvent (e.g. NMP), and more than 0.1 wt. % of the para-dichlorobenzene, relative to the total weight of the PPS polymer mixture. PPS polymer synthesis, including polymerization and termination, and recovery, including acid treatment and metal cation treatment, is discussed in US patent application publication number, 2015/0175748 to Fodor et al., filed Dec. 19, 2013 ("the '748 patent") and incorporated by reference herein in its entirety.

Subsequent to termination, a recovery process is implemented. The recovery process includes one or more washes, where each wash includes contacting the PPS polymer formed during polymerization with a liquid. The liquid of each wash is independently selected from water, aqueous acid, and an aqueous metal cation solution. Examples of post-reaction recovery processes is discussed in U.S. patent application publication number 2015/0175748 to Fodor et al., entitled "Process for Production of Poly(Arylene Sulfide)," incorporated herein by reference. Based upon the disclosure herein, the person of ordinary skill in the art will know how to select a recovery process to obtain the PPS polymer described herein.

Subsequent to the recovery process, the PPS polymer mixture can be dried. The drying can be performed at any temperature which can substantially dry the PPS polymer mixture, to yield a dried PPS polymer. Desirably, the drying process is selected to help prevent oxidative curing of the PPS polymer. For example, if the drying process is conducted at a temperature of at least 100° C., the drying can be conducted in a substantially non-oxidizing atmosphere (e.g., in a substantially oxygen free atmosphere or at a pressure less than atmospheric pressure, for example, under vacuum). When the drying process is conducted at a temperature less than 100° C., the drying process can be facilitated by performing the drying at a pressure less than atmospheric pressure so the liquid component can be vaporized from the PPS polymer mixture. When the drying is performed at a temperature of less than 100° C., the presence of a gaseous oxidizing atmosphere (e.g. air) generally does not result in a detectable curing of the PPS polymer.

Processing of Polyphenylene Sulfide Polymers and Articles

The PPS polymers described herein, having surprisingly improved melt stability, can be desirably processed using melt-processing techniques known in the art including, but not limited to, fiber processing and profile extrusion.

Melt processing involves heating polymer material to a temperature at or above its melting point, and subsequently forming a shaped article from the molten polymer. Because the PPS polymers of interest herein have significantly improved melt stability, the properties of the polymer in the melt state (e.g. rheological properties such as melt viscosity and physical properties such as number average molecular weight) has improved stability during processing. The improved property stability provides significant improvement in the predictability of processing conditions and significantly fewer issues (e.g. clogging issues), relative to PPS polymers having reduced melt-stability. For example, during melt processing, the polymer is maintained at a temperature at or above its melt temperature for a significant amount of time. During the prolonged heating, polymers having reduced melt stability have a greater amount of degradation, causing changes in the properties of the polymer. The degradation can cause build-up in the melting or shaping apparatus, causing defects in the shaped articles. Additionally or alternatively, the change in properties of the polymer can cause defects in the shapes, as the processing conditions of the polymer are no longer suitable for the polymer composition. For the PPS polymers of interest herein, melt processing involves heating the PPS polymer composition to a temperature of from 290° C. to 350° C., from 300° C. to 340° C., or from 305° C. to 325° C.

One melt processing approach includes fiber processing. In one such approach, melt spinning, solid PPS polymer (e.g. in the form of granules or pellets) is melted and extruded through a spin head (e.g. spinneret) having a nozzle (e.g. holes in the spinhead allowing the molten polymer to exist the spin head). In some embodiments, the solid PPS polymer fed into an extruder having a barrel that is heated to melt the solid PPS polymer and maintain it at a temperature at or above its melting point. The PPS polymer is generally fed through the extruder barrel using one or more screws to propel the polymer along the barrel. The molten polymer exiting the extruder is metered to a spin head having at least one nozzle to shape PPS fibers with the desired dimensions. In some embodiments, the PPS fiber has a diameter of at least 0.5 mm or 1 mm. Additionally or alternatively, the PPS fiber can have a diameter of no more than 10 mm, no more than 8 mm, no more than 7 mm, no more than 6 mm or no more than 5 mm. In some embodiments, the PPS fiber can have a length of at least 10 mm, at least 15 mm, at least 30 mm, at least 50 mm, at least 75 mm, at least 100 mm, a least 500 mm or at least 1 m. The exiting fiber (or fibers in the case of multiple nozzles) can be collected and drawn by, for example, a take-up wheel. In some embodiments, in the spin head includes multiple nozzles, the spin head spins at a predetermined frequency to entwine the fibers to create yarns. In another fiber processing approach, melt blowing, the PPS polymer exiting the extruder passes through one or more nozzles. The PPS polymer fibers exiting the one or more nozzles are carried from the nozzle by a blowing gas. The blown fibers generally collect as a nonwoven mat. Regardless of the particular melt processing fiber approach, as mentioned above, degraded polymer can deposit on the extruder and nozzle. The deposited degradation products can compromise the morphology of the formed PPS fibers and can lead to significant fiber breakage (due, in part, to compromised flow conditions). Because the PPS fibers described herein have significantly improved melt stability, defects in fiber morphology and fiber breakage is significantly reduced relative to PPS polymers having relatively reduced melt stability.

PPS fibers, formed from the PPS polymers described herein, can be advantageously incorporated into articles including, but not limited to, hot gas filtration devices as well as industrial belts. Hot gas filtration devices include a felt formed from PPS fibers (a collection of interlocking PPS fibers). The felt is generally a needle punched felt, fabricated by vertically needling the PPS fibers together so they become interlocked. In some embodiments, the felt can be shaped into a bag to form a filter bag. In other embodiments, the felt can be shaped to have a planar geometry, or any other suitable geometry, a filter suitable for a specific application setting. In some embodiments, the PPS fibers can also be formed into industrial belts. For example, in one embodiment, the PPS fiber can be formed into a belt of a conveyor system. The conveyor system generally includes two or more pulleys (or drums). In some embodiments, at least one of the pulleys is a drive pulley (powered). The conveyor belt is a continuous belt that rotates the pulleys. Material or articles disposed on top of the conveyor belt is moved along with the conveyor belt as the pulleys rotate. The felts can be especially desirable in application settings where the conveyor belts are exposed to elevated temperatures (e.g. where the material on the conveyor belt is dried with heating).

Another melt processing approach involves profile extrusion. In profile extrusion, solid PPS polymer is melted in an extruder and pushed through a die to form a stock shape. In general, one or more screws are used to push the molten PPS polymer through the extruder. The stock shapes are basic geometric shapes having a cross-section selected from a circle, an oval, a triangle, or a square or other rectangle. Accordingly, the stock shapes can be a cylinder, an elliptical cylinder, a triangular prism, a cube or rectangular prism. In general, the cross-section is defined by a relatively large area which requires an extruder including a barrel that has a relatively large volume. Moreover, because of the increased volume of PPS polymer in the barrel, residence times of the PPS polymer are relatively large. The problems associated with reduced PPS polymer melt stability described above are, therefore, exacerbated, in part, due to increased PPS polymer degradation owing to the relatively large amount of PPS polymer and relatively large residence times. Accordingly, the PPS polymer described herein can be advantageously incorporated into stock shape production.

EXAMPLES

The following examples demonstrate the synthesis and rheological performance of PPS polymers.

Example 1: Synthesis of PPS Polymers

This example demonstrates the synthesis of PPS polymers.

To demonstrate synthesis, 12 samples (Samples 1-12) were formed. Each sample was formed as follows. To a 1 L titanium reactor was added 27.20 g NaOH pellets (0.680 moles), 18.05 g (0.220 moles) sodium acetate, 62.83 g NaSH-hydrate (59.49 wt. % NaSH, 0.6667 moles NaSH), and 167 g n-methylpyrrolidone ("NMP"). The reactor was sealed, pressured/vented five times with nitrogen (92 psig), stirred at 320 rpm, and warmed to 150° C. over 45 minutes. Meanwhile, 98.00 g 1,4-dichlorobenzene ("DCB") (0.667 moles) and 50 g NMP were added to a 300 mL stainless steel addition vessel wrapped in heating tape. The addition vessel was pressurized and vented with nitrogen five times, pressurized with nitrogen to 90 psig, and then heated to 100° C. to completely melt the DCB. After the internal reactor temperature reached 150° C. and the pressure reached 40 psig, the reactor was vented slowly and a clear condensate collected. A small stream of nitrogen was added to the reactor to help remove the water. After 40 minutes, 28 g condensate was collected and the internal reactor temperature reached 200° C. The condenser was removed, the nitrogen flow stopped, and the contents of the warm DCB addition vessel (~120 pisg) added to the reactor. The addition vessel was removed, opened, and 25 mL NMP added. The vessel was pressurized and vented three times with nitrogen, pressurized with nitrogen to 90 psig, and the NMP rinse added to the reactor. The reactor was sealed and warmed to 240° C. over 20 minutes.

After two hours at 240° C., the temperature was raised to 265° C. over 30 minutes, and the reactor maintained at 265° C. for an additional 2 hours. The final pressure was 140 psig. The heater was lowered, the agitator speed reduced to 120 rpm and the reactor contents cooled at 1.6° C./min over one hour. The stirrer was stopped and the reactor allowed to cool to ambient temperature.

The reactor (~15 psig) was then vented and opened. The thick off-white slurry (reaction mixture) was removed from the reactor and placed in a 3 L stainless steel beaker with a large PTFE-coated magnetic stir bar. 200 mL NMP was added to the slurry, the mixture stirred and warmed to 80° C. The slurry was then filtered while warm through a 600 mL medium porosity sintered glass filter to give a clear yellow filtrate and off-white solid (salts and polymer). The filter cake was washed once with 100 mL warm NMP and the NMP-wet solids transferred back to the stainless steel beaker with 300 mL 80° C. deionized ("DI") water. The slurry was stirred for 15 minutes and the milky supernatant decanted into a 3 L plastic beaker. The remaining coarse solid was washed an additional four times in the same way using DI water, calcium acetate, acetic acid or a combination of one or more thereof. The supernatant was nearly clear after the final wash. The coarse polymer was then isolated by filtration and washed on the filter with hot DI water three times. The solid was then dried in a vacuum oven overnight at 90-100° C./26" Hg with a small stream of nitrogen to give 62 g (86% yield) of coarse white polymer.

Example 2: Characterization and Rheological Performance of PPS Polymers

This example demonstrates the characterization and rheological performance of PPS polymers synthesized in Examples 1, above.

For each sample in Example 1, terminal functionalization, melt viscosity and weight loss were measured. The end-capping agent concentration was measured using ICP-OES as follows: A clean, dry platinum crucible was placed onto an analytical balance, and the balance was zeroed. One half to three gram of PPS polymer sample was weighed into the boat and weight was recorded to 0.0001 g. The crucible with sample was placed in the muffle furnace (Thermo Scientific Thermolyne F6000 Programmable Furnace) and the door was closed. The furnace was gradually heated to 525° C. The sample was dry ashed at that temperature for 10 hrs. When the ashing cycle was completed and the furnace cooled down to room temperature, the crucible was taken out of the furnace and placed in a fume hood. The ash was dissolved in diluted hydrochloric acid. The solution was transferred to a 25 mL volumetric flask, using a polyethylene pipette. The crucible was rinsed twice with approximately 5 mL of ultrapure water (R<18 megohm-centimeter ("MΩcm"), where R is the electrical resistivity) and these washes were added to the volumetric flask to effect a quantitative transfer. Ultrapure water was added to the mark of 25 mL flask. A stopper was put on the top of the flask and the content was shaken well to mix.

ICP-OES analysis was performed using inductively-coupled plasma emission spectrometer Perkin-Elmer Optima 8300 dual view. The spectrometer was calibrated using a set of NIST traceable multi-element mixed standards with analyte concentration between 0.0 and 10.0 mg/L. A linear calibration curve was obtained in a whole range of concentrations with a correlation coefficient better than 0.9999 for each of 48 analytes. The standards were run before and after every ten samples to ensure instrument stability. The results were reported as an average of three replicates. The concentration of each elemental impurity in the sample was calculated with the following equation: A=E*(B*C)/D, where A is the end-capping agent concentration in the sample in µeq, B is the end-capping agent concentration of in the solution analyzed by ICP-OES in mg/L, C is the volume of the solution analyzed by ICP-OES in mL and D is the sample weight in grams used in the procedure. For the analysis of calcium end-capping agents, E is (1/40) and, for the analysis of sodium end-capping agents, E is (1/23).

Melt viscosity was measured by capillary rheometry at a constant shear rate, according to ASTM D3835-02. Measurements were taken on a Dynisco LCR 7000, having a barrel diameter of 9.55 mm and a die having a length ("L") of 30 mm, a diameter ("D") of 1.0 mm and a L/D=30. Measurements were taken at 310° C. at a shear rate of 1216 $s^{-1}$, on a 10 g-12 g sample. Sample was loaded into the barrel and heated to and maintained at a temperature of 310° C. The melt viscosity ratio was calculated using the measure melt viscosity of the sample after being in the barrel for 40 minutes (MV40) divided by the measured melt viscosity of the sample after being in the barrel at 5 minutes at 310° C. (MV5). For clarity, time zero was when the sample in the barrel reached a temperature of 310° C. As noted above, VR40 was calculated as the ratio of MV40/MV5.

Weight loss was measured by TGA, using a thermogravimetric analyzer according to ASTM E1131-08. Measurements were taken on a TA Instruments TGA Q500 thermogravimetric analyzer using a 99.998% pure nitrogen carrier gas and 60 ml/min furnace flow rate. Equilibration was at 30.00° C., using an isothermal for 2.00 min. The ramp rate was 10.00° C./min. TGA was performed using a sample quantity of 5 mg to 15 mg. The weight loss of the samples was measured at 100° C. (WL100), 310° C. (WL310) and 350° C. (WL350). The relative weight loss at 310° C. (WL310) was calculated, as noted above, as the ratio 100*(W100−W310)/W100. Similarly, the weight loss at 350° C. (WL350) was calculated, as noted above, as the ratio 100*(W100−W350)/W100.

The results of characterization and rheological performance are displayed in Tables 1 and 2, below. In the Tables [Ca] and [Na] are the concentrations of end-capping agents Ca and Na, MV is the melt viscosity and VR40 is the melt viscosity at 40 minutes/melt viscosity at 5 minutes.

TABLE 1

| Sample # | End-Capping Agent Concentration | | Melt Viscosity | | |
|---|---|---|---|---|---|
| | [Ca] (μeq) | [Na] (μeq) | MV at 5' (Pa · s) | MV at 40' (Pa · s) | VR40 |
| 1 | 0.4 | 21.6 | 147.9 | 154.5 | 1.04 |
| 2 | 0.6 | 21.1 | 152.6 | 152.8 | 1.00 |
| 3 | 0.8 | 20.2 | 141.3 | 139.4 | 0.99 |
| 4 | 1.4 | 19.8 | 153.1 | 154.9 | 1.01 |
| 5 | 3.0 | 16.8 | 155.7 | 149.1 | 0.96 |
| 6 | 3.6 | 13.6 | 153.1 | 149 | 0.97 |
| 7 | 10.1 | 5.9 | 189.7 | 160.8 | 0.85 |
| 8 | 10.0 | 6.3 | 138.7 | 122.1 | 0.88 |
| 9 | 12.7 | 1.3 | 139.6 | 109.1 | 0.78 |
| 10 | 9.6 | 1.2 | 102.3 | 81.7 | 0.80 |
| 11 | 2.2 | 0.3 | 94.7 | 74.9 | 0.79 |
| 12 | 0.5 | 1.1 | 154.5 | 104.4 | 0.68 |

TABLE 2

| Sample # | Weight Loss | |
|---|---|---|
| | Wt(100-310)/Wt 100 | Wt(100-350)/Wt 100 |
| 1 | 0.04% | 0.07% |
| 2 | 0.08% | 0.14% |
| 3 | 0.06% | 0.11% |
| 4 | 0.03% | 0.08% |
| 5 | 0.02% | 0.05% |
| 6 | 0.06% | 0.11% |
| 7 | 0.11% | 0.17% |
| 8 | 0.11% | 0.17% |
| 9 | 0.14% | 0.19% |
| 10 | 0.10% | 0.17% |
| 11 | 0.15% | 0.27% |
| 12 | 0.12% | 0.23% |

Referring to Table 1, the samples having a Ca ionic end-capping agent concentration of no more than 10 μeq and a Na ionic end-capper concentration of at least 10 μeq, had increased melt stability relative to the other samples tested. For example, Samples 1 to 6 had a Ca end-capper concentration of between 3.6 μeq and 0.4 μeq and a Na end-capper concentration of between 13.6 μeq and 21.6 μeq. Simultaneously, the VR40 values for samples 1 to 6 differed from 1.0 by 0% to 4%. For Samples 7 to 10, the Ca end-capping agent concentration was between 9.6 μeq and 12.7 μeq and the Na end-capping agent concentration was between 1.2 μeq and 6.3 μeq, with VR40 values differing from 1.0 by 12% to 22%. Similarly, for Samples 11 and 12, the Ca end-capping agent concentration was between 0.5 μeq and 2.2 μeq and the Na end-capping agent concentration was between 0.3 μeq and 1.1 μeq, with VR 40 values differing from 1.0 by 21% to 32%.

Referring to Table 2, Samples 1 to 6 also had reduced weight loss, relative to Samples 7 to 12. For examples, the relative weight loss at 310° C. for Samples 1 to 6 were between 0.02% and 0.08% and the relative weight loss at 350° C. was between 0.05% and 0.14%. For Samples 7 to 10, the relative weight loss at 310° C. was between 0.10% and 0.14% and the relative weight loss at 350° C. was between 0.17% and 0.19%. Moreover, for Samples 11 and 12, the relative weight loss at 310° C. was between 0.10% and 0.14% and the relative weight loss at 350° C. was between 0.17% and 0.19%. The decreased relative weight loss reflects improved melt-stability of the polymer.

The invention claimed is:

1. A polyphenylene sulfide ("PPS") polymer comprising:
   (i) at least 0.4 μeq and no more than 10 μeq of calcium end-capping agents, wherein each calcium end-capping agent is represented by a formula selected from the following group of formulae:

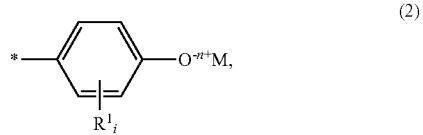

(2)

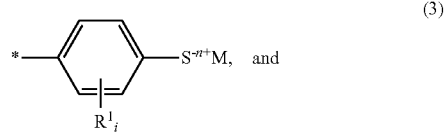

(3)

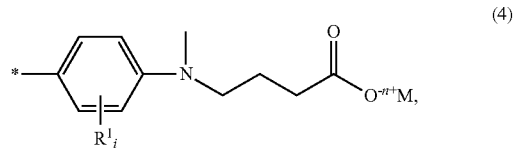

(4)

where M is Ca and n is 2 and
   (ii) at least 10 μeq of sodium end-capping agents, wherein each sodium end-capping agent is represented by a formula selected from the group of formulae consisting of Formulae (2) to (4), wherein M is Na and n is 1; and
wherein
   $R^1$, at each location, is independently selected from the group consisting of an alkyl, an aryl, an alkoxy, an aryloxy, an alkylketone, an arylketone, a fluoroalkyl, a fluoroaryl, a bromoalkyl, a bromoaryl, a chloroalkyl, a chloroaryl, an alkylsulfone, an arylsulfone, an alkylamide, an arylamide, an alkylester, an arylester, a fluorine, a chlorine, and a bromine;
   i is an integer from 0 to 4,
   wherein the PPS polymer has a melt viscosity at 40 minutes (MV40) at 310° C. and a melt viscosity at 5 minutes (MV5) at 310° C., and
   wherein the PPS polymer comprises a VR40=MV40/MV5 of at least 0.9 and of no more than 1.15.

2. The PPS polymer of claim 1, wherein i is 0.

3. The PPS polymer of claim 1, wherein the calcium end-capping agent concentration is no more than 4 μeq.

4. The PPS polymer of claim 1, wherein the sodium end-capping agent concentration is at least 12 μeq.

5. The PPS polymer of claim 1, wherein the PPS polymer comprises a VR40 from 0.93 to 1.1.

6. The PPS polymer of claim 5, wherein the PPS polymer comprises a VR40 from 0.95 to 1.05.

7. The PPS polymer of claim 1, wherein the PPS polymer has a relative weight loss at 310° C. of no more than 0.09%.

8. The PPS polymer of claim 1, wherein the PPS polymer has a relative weight loss at 350° C. of no more than 0.15%.

9. A polymer fiber comprising the PPS polymer of claim 1.

10. The polymer fiber of claim 9, wherein the fiber has a diameter of at least 0.5 mm or a diameter of no more than 10 mm.

11. The polymer fiber of claim 9, wherein the polymer fiber has a length of at least 10 mm.

12. The polymer fiber of claim 9, wherein the polymer fiber has a length of at least 100 mm.

13. A felt comprising the polymer fiber of claim 9.
14. A hot gas filtration device comprising the felt of claim 13.
15. An industrial belt comprising the felt of claim 13.

\* \* \* \* \*